J. I. EMM.
AUTOMOBILE SIGNAL.
APPLICATION FILED MAR. 9, 1917.
1,257,203.
Patented Feb. 19, 1918.
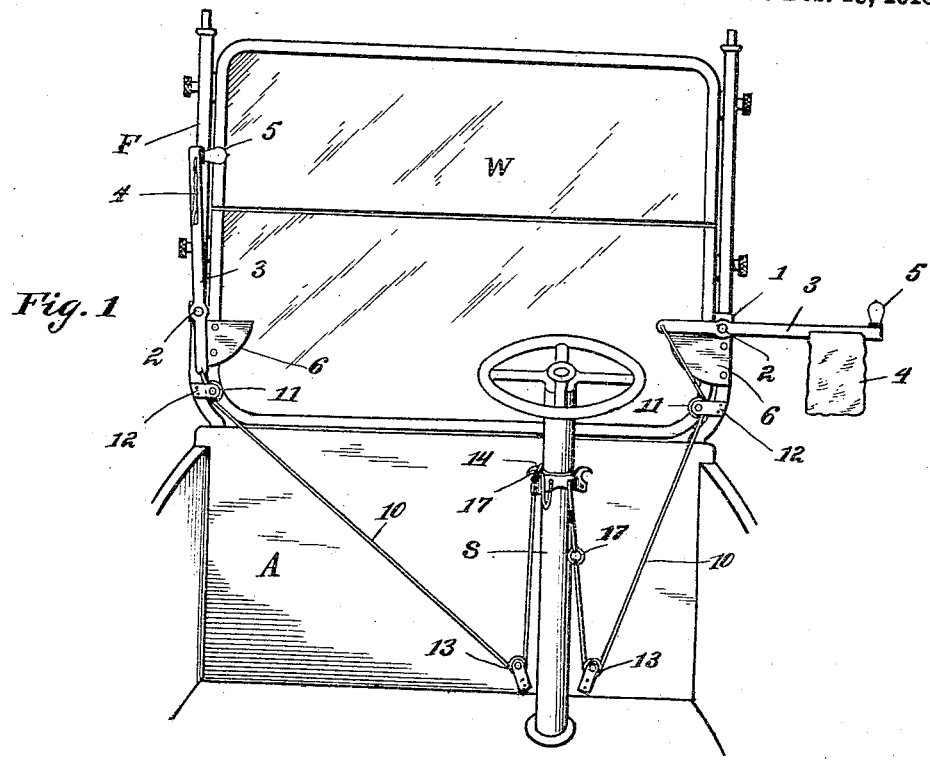
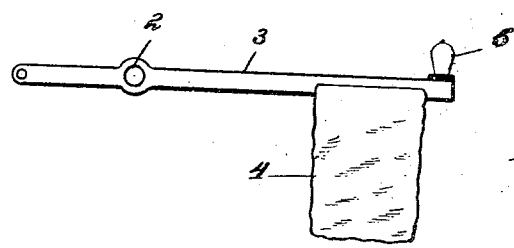
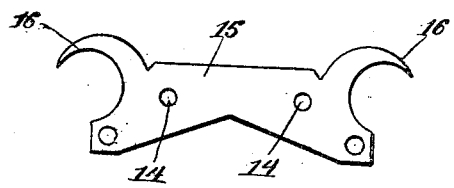
WITNESSES
INVENTOR
John I. Emm
BY Victor J. Evans
ATTORNEY

UNITED STATES PATENT OFFICE.

JOHN I. EMM, OF SYRACUSE, NEW YORK.

AUTOMOBILE-SIGNAL.

1,257,203.　　　　Specification of Letters Patent.　　Patented Feb. 19, 1918.

Application filed March 9, 1917.　Serial No. 153,635.

*To all whom it may concern:*

Be it known that I, JOHN I. EMM, a citizen of the United States, residing at Syracuse, in the county of Onondaga and State of New York, have invented new and useful Improvements in Automobile-Signals, of which the following is a specification.

This invention relates to vehicle signals, and more especially to those adapted to be used on an automobile for indicating the direction in which the driver is to turn as well as for giving an indication when he is to stop; and an object of the invention is to improve details of construction.

To this end the invention consists in right and left-hand swinging signals mounted on the frame of the wind shield, falling into visible position by gravity, and raised by cords which are held taut by hooks of a novel construction mounted on the steering post. The invention also contemplates means for preventing the swinging arms from vibrating and rattling, and other details—all of which will appear in the following specification, reference being had to the drawings wherein:—

Figure 1 is a perspective view of the front part of an automobile with this improvement attached, one signal being raised and the other depressed and visible.

Fig. 2 is an enlarged detail of one of the swinging arms.

Fig 3 is an enlarged detail of the hook plate for attachment to the steering post.

We are not concerned with any part of the automobile A excepting the wind shield W and frame F, and the steering post S, but parts of the automobile are illustrated in Fig. 1 for the sake of showing the relative position which this attachment bears thereto. Mounted on each side bar of the wind shield is a clip 1 to which at 2 is pivoted a lever 3 near its inner end, its outer end carrying a signal which is shown as a flag 4 about six by eight inches in size and preferably red for use in the day time, and a red electric bulb 5 carried at the extreme end of the arm for use in the night time. The wiring for this bulb need not be shown, as it constitutes no part of the present invention. When the current is turned on the flag may be permitted to remain, as it is nearer the pivot than the bulb and never hangs over the latter. Secured to the frame F below the pivot is a guard plate 6 so disposed that the inner arm of the lever 3 moves against the face of this plate when the lever is upright, and strains the latter a little on its pivot so as to prevent rattling of parts, while yet not holding the arm so rigidly so that it may not fall outward by gravity as described below. From this it will be seen that when the lever 3 is in what has been referred to as its "upright" position, it is not strictly vertical, but the longer arm above the pivot stands a little outside the same in order that it will fall outward by gravity if it be permitted to do so. Connected to the inner end of the inner arm of each lever 3 is a light cord 10 which passes outward and downward and over a pulley 11 carried by a clip 12 attached to the frame F below the clip 1, and after passing around this pulley the cord is led inward and over one of a pair of pulleys 13 carried inside the dash in suitable bearings not necessary to amplify. From this last-named pulley, the cord is led to a hook plate best seen in Fig. 3, and attached at its extremity thereto at the point 14. Said hook plate 15 is of the shape shown in this view, and is secured upon the steering post S by a clip of suitable construction not necessary to amplify in detail; but the important feature thereof is that it has a pair of hooks or horns 16 which curve upward and outward and decrease in size toward their tips. Each cord has fastened within its length near its end at the point 14 a small ring 17 of a size to pass over the tip of one of said horns, and the position of this ring is such that when a cord is drawn upon and its ring passed over the horn, the inner arm of the lever 3 is drawn down so that the entire lever stands upright and the signal is raised as seen at the left of Fig. 1. In other words, when the ring is passed over the horn tension is put on the cord and the signal disappears because it is raised practically into line with the frame F of the wind shield, so that persons in front or in rear of the vehicle may not see this signal. If the latter be a flag as seen at 4, it folds as seen at the left of Figs 1; and if it be a bulb or lamp as at 5, it is invisible to persons in front because it stands behind the frame F of the wind shield and it is invisible to persons in the rear because of the bulging of the sides of the automobile body, curtains, seats, et cetera.

When now the driver proposes to turn in one direction, he has but to disengage the proper ring from its horn and release the cord; and the weight of the signal at the outer end of the lever 3 causes the latter to fall outward as seen at the right of Fig. 1, so that the signal is displayed because it stands at some distance beyond the side of the car. If the driver intends turning in the opposite direction, he displays the other signal; and if he intends to stop, he drops out both signals so that they may be seen simultaneously. Attention is directed to the peculiar form of the hook plate as illustrated in Fig. 3. Its horns curve upward and outward and decrease in size toward their tips so that the rings very easily slide off of them if given the slightest push. This plate is clipped over the steering post about in the position seen in Fig. 1, where it is quite possible for the driver with his knee to push either ring off its horn in case both his hands should happen to be busy, or by moving the knee upward and then laterally in opposite directions he can push both rings off the horns and drop out both signals when his hands are busy bringing the machine to a quick stop on a crowded street. This is a highly important feature of my invention, because hitherto devices which had the same general end in view required the use of one hand or one foot, and sometimes both. I propose to attach the plate 15 to what might be called the under or rear side of the steering post where it is within reach of the driver's knee as will be clear. Again, the anti-rattling plate 6 is a feature which adds to the value of this attachment, because it prevents rattle; although of course it could be omitted.

What is claimed as new:—

1. An automobile signal, the combination with the signals proper, two levers supporting them at their outer ends and respectively pivoted near their inner ends on the side bars of the wind shield, cords leading from the inner ends of said levers over guide pulleys to points inside the dash, and rings within said cords near their inner ends; of a hook plate secured beneath the steering post within reach of the operator's knee and to which plate the inner ends of said cords are attached, said plate having laterally projecting horns with which either ring may be engaged to hold its signal raised, for the purpose set forth.

2. In an automobile signal, the combination with the signal proper, means for displaying it at one side of the wind shield, a cord leading from it to a point within the car, and a ring near the inner end of said cord; of a hook plate clipped to the rear side of the steering post within reach of the operator's knee, and a horn formed on said plate and bent upward and laterally outward and tapered to its point for reception of said ring, the whole for action substantially as described.

In testimony whereof I affix my signature.

JOHN I. EMM.